United States Patent [19]

Doluca

[11] Patent Number: 5,532,577
[45] Date of Patent: Jul. 2, 1996

[54] METHOD AND APPARATUS FOR MULTIPLE OUTPUT REGULATION IN A STEP-DOWN SWITCHING REGULATOR

[75] Inventor: Tunc Doluca, Saratoga, Calif.

[73] Assignee: Maxim Integrated Products, Inc., Sunnyvale, Calif.

[21] Appl. No.: 222,461

[22] Filed: Apr. 1, 1994

[51] Int. Cl.$^6$ ................................................ G05F 1/56
[52] U.S. Cl. .................................... 323/282; 323/267
[58] Field of Search ................................ 323/222, 267, 323/266, 282, 284, 285, 290, 351

[56] References Cited

U.S. PATENT DOCUMENTS

| | | | |
|---|---|---|---|
| 4,454,558 | 6/1984 | Huddart | 361/153 |
| 4,881,023 | 11/1989 | Perusse et al. | 323/266 |
| 5,019,770 | 5/1991 | Harada et al. | 323/282 |
| 5,070,294 | 12/1991 | Nochi | 323/267 |
| 5,257,170 | 10/1993 | Spruijt | 363/16 |
| 5,386,359 | 1/1995 | Nochi | 323/282 X |
| 5,397,976 | 3/1995 | Madden et al. | 323/222 |
| 5,418,704 | 5/1995 | Hua et al. | 323/282 X |
| 5,422,562 | 6/1995 | Mammano et al. | 323/282 |

*Primary Examiner*—Peter S. Wong
*Assistant Examiner*—Adolf Berhane
*Attorney, Agent, or Firm*—Blakely, Sokoloff, Taylor & Zafman

[57] ABSTRACT

A step-down switching regulator of the present invention includes (1) a magnetic storage device having at least one primary output and one secondary output, (2) a current sensing device for detecting current through a primary winding of the magnetic storage device, (3) a first switch, (4) a second switch, (5) a first comparator for detecting whether the current through the primary winding is greater than a limit value, (6) a second comparator for detecting loss of regulation in the secondary output, and (7) a switch logic circuitry for allowing only one of the first switch or the second switch to turn on at a time. When the primary output is out of regulation, the first switch turns on to deliver power to the primary output. When the secondary output is out of regulation, one of two methods can be used to supply power to the secondary output. A first method turns on the first switch for a short time, and then the second switch turns on to deliver power to the secondary output. A second method turns on the second switch without first turning on the first switch. In either methods, the second switch can be turned off at the end of a pre-determined time period, at the end of a clock cycle, when the current through the primary winding exceeds a pre-determined limit value, or when the current through the primary winding is substantially zero.

30 Claims, 8 Drawing Sheets

METHOD AND APPARATUS FOR MULTIPLE OUTPUT REGULATION IN A STEP-DOWN SWITCHING REGULATOR

BACKGROUND OF THE INVENTION

1. Field of the Invention:

The present invention relates to the field of power supplies and, more particularly, to step-down DC-DC converters or step-down switching regulators wherein controlling the primary and secondary output voltages is desired.

Figure 1A:
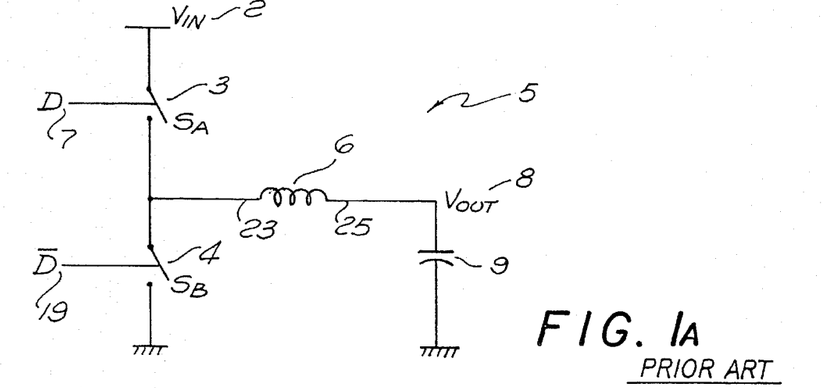
FIG. 1A is a prior art step-down switching regulator having a primary winding.

2. Description of the Related Art:

FIG. 1A shows a prior art step-down switching regulator 5 with a primary winding 6. Step-down switching regulator 5 includes primary winding 6, a capacitor 9 and two input switches $S_A$ 3 and $S_B$ 4 controlled by input signals D 7 and $\overline{D}$ 19, respectively. It should be noted that the signal $\overline{D}$ is a logical inversion of the signal D, according to the conventional signal naming provision. A step-down switching regulator such as the one shown in FIG. 1A is commonly used to convert a DC unregulated input voltage, $V_{IN}$ 2, to a regulated DC output voltage, $V_{OUT}$ 8. In this configuration, $V_{OUT}$ 8 is less than $V_{IN}$ 2, and hence, the name step-down is used. Switches $S_A$ 3 and $S_B$ 4 of step-down switching regulator 5 are used to alternatively connect the first side (23) of primary winding 6 to either $V_{IN}$ 2 or ground. The second side (25) of primary winding 6 is connected to $V_{OUT}$ 8. The regulation of $V_{OUT}$ 8 is achieved by controlling the duty cycle of the input switches—$S_A$ 3 and $S_B$ 4.

In most applications, $S_B$ 4 has been a rectifier rather than a switch. However, recent demand for higher conversion efficiencies and lower output voltages has forced the use of switches, also called as synchronous rectifiers, for $S_B$ 4.

Figure 1B:
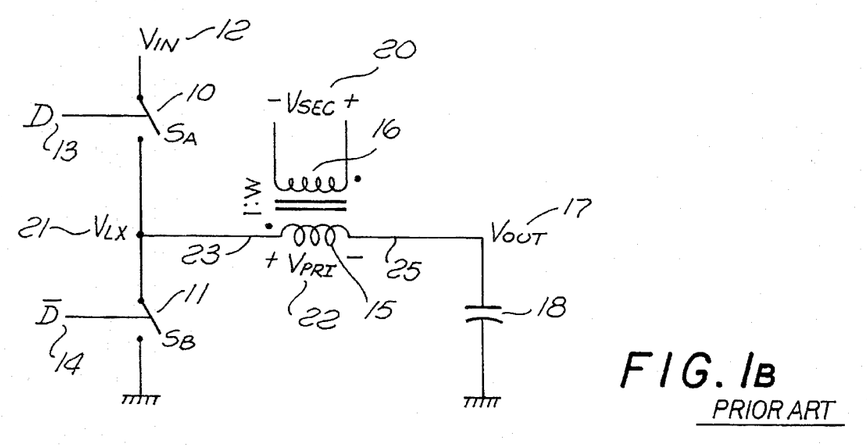
FIG. 1B is a prior art step-down switching regulator having a primary and secondary windings.
Figure 1C:
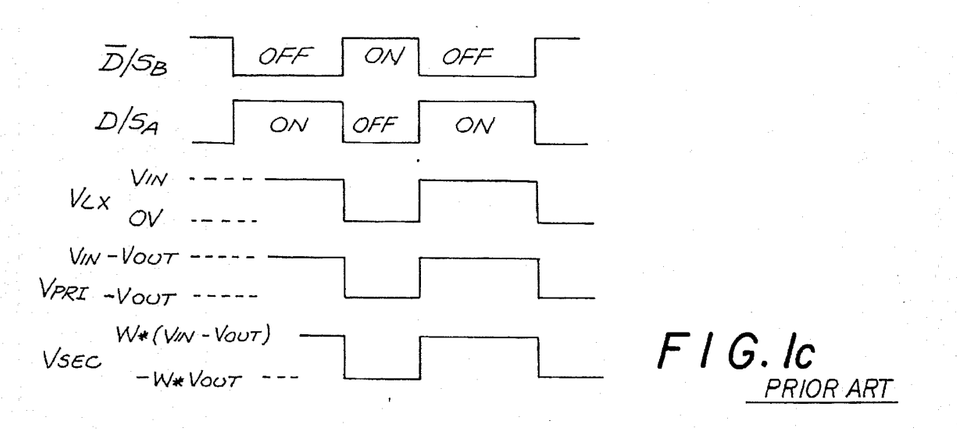
FIG. 1C is a timing diagram for the prior art in FIG. 1B showing voltages at various nodes.

Now referring to FIG. 1B, because many applications require more than one output voltage, a step-down switching regulator 25 is provided with a secondary winding 16 magnetically coupled to a primary winding 15. It should be noted that more windings can be added to generate more output voltages. A secondary output voltage, $V_{SEC}$ 20, developed across secondary winding 16 can be regulated because the voltage, $V_{PRI}$ 15, across primary winding 15 is known when $S_B$ 11 is on. As shown in FIG. 1C, $V_{SEC}$ 20 is equal to $-W*V_{OUT}$ when $S_A$ 10 is off and $S_B$ 11 is on, where W is the ratio determined by dividing the number of turns in secondary winding 16 by the number of turns in primary winding 15. The coupling direction is chosen such that $V_{SEC}$ 20 is the turns ratio W times $V_{PRI}$.

Now referring to FIGS. 1B and 1C, Since (i) an input signal D 13 and an input signal $\overline{D}$ 14 are complementary, (ii) D controls $S_A$ 10, and (iii) $\overline{D}$ 14 controls $S_B$ 11, when $S_A$ 10 is on, $S_B$ 11 is off. $V_{LX}$ 21 is equal to $V_{IN}$ when $S_A$ 10 is on, and $V_{LX}$ 21 becomes zero when $S_B$ 11 is on. $V_{PRI}$ 22 stays at the voltage level of $V_{IN}-V_{OUT}$ when $S_A$ 10 is on, and $V_{PRI}$ 22 becomes $-V_{OUT}$ when primary winding 15 is connected to ground through $S_B$ 11. Because of the coupling direction, $V_{SEC}$ 20 is $W*V_{PRI}$. Thus, when $V_{PRI}$ 22 is $V_{IN}-V_{OUT}$, $V_{SEC}$ 20 becomes $W*(V_{IN}-V_{OUT})$, and when $V_{PRI}$ 22 is $-V_{OUT}$, $V_{SEC}$ 20 is $-W*V_{OUT}$.

A DC output voltage can be obtained by rectifying and filtering $V_{SEC}$ 20. FIGS. 2A–2D show various ways of connecting the output(s) of the secondary winding(s) to generate output voltages that are: (i) positive, (ii) positive above $V_{OUT}$, (iii) negative and (iv) negative and positive.

Figure 2A:
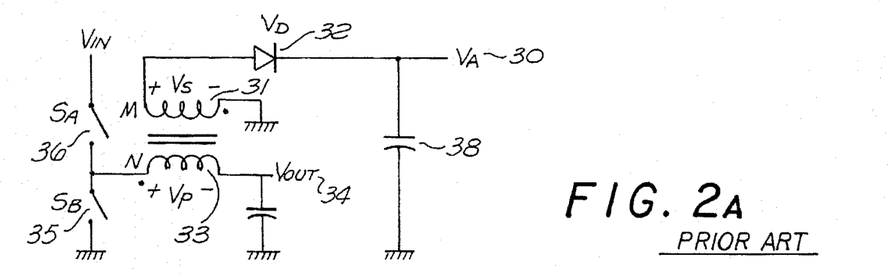
FIG. 2A is a prior art step-down switching regulator for generating a positive secondary output voltage.

FIG. 2A shows a prior art step-down switching regulator for generating a positive secondary output voltage. The positive side of a secondary winding 31 is coupled to a rectifier 32 and to an output voltage $V_A$ 30 to produce a positive output voltage at $V_A$ 30. The negative side of secondary winding 31 is connected to ground. The output voltage $V_A$ 30 is equal to the voltage $V_S$ across secondary winding 31 subtracted by $V_D$ across rectifier 32, or $V_A=V_S-V_D$. When $S_B$ 35 is on, the voltage $V_P$ across a primary winding 33 is $-V_{OUT}$. Since $V_S$ is $M/N*(-V_P)$, where M is the number of turns in secondary winding 31, and N is the number of turns in primary winding 33, $V_S$ is $M/N*V_{OUT}$. Thus, $V_A$ 30 becomes $M/N*V_{OUT}-V_D$. Accordingly, the step-down switching regulator in FIG. 2A produces a positive output voltage.

Figure 2B:
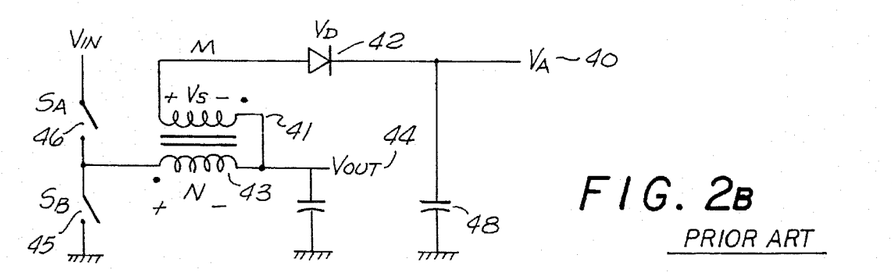
FIG. 2B is a prior art step-down switching regulator for generating a positive secondary output voltage above the output voltage of a primary winding.

Now referring to FIG. 2B, a prior art step-down switching regulator for generating a positive secondary output voltage above the output voltage of a primary winding is shown. The negative side of a secondary winding 41 is connected to $V_{OUT}$ 44, while the positive side of secondary winding 41 is coupled to a rectifier 42 and to an output voltage $V_A$ 40 to generate a positive voltage above $V_{OUT}$ at $V_A$ 40. In FIG. 2B, the output voltage $V_A$ 40 is equal to the sum of the voltage $V_S$ across secondary winding 41 and $V_{OUT}$ 44 subtracted by $V_D$ across rectifier 42, or $V_A=V_S+V_{OUT}-V_D$. Since $V_S$ is $M/N*V_{OUT}$, $V_A$ 40 becomes $M/N*V_{OUT}+V_{OUT}-V_D$, or $V_A=(M/N+1)*V_{OUT}-V_D$. $V_A$ 40 is equivalent to the sum of $V_A$ 30 and $V_{OUT}$ 34. Accordingly, the step-down switching regulator in FIG. 2B produces a positive output voltage above $V_{OUT}$ 44.

Figure 2C:
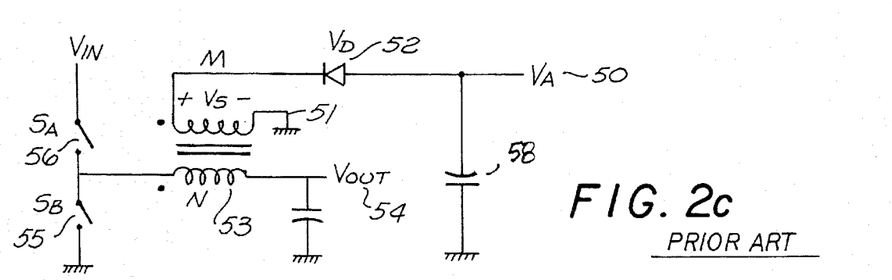
FIG. 2C is a prior art step-down switching regulator for generating a negative secondary output voltage.

FIG. 2C presents a prior art step-down switching regulator for generating a negative secondary output voltage. While the elements are connected in a similar manner as the ones in FIG. 2B, the coupling direction of a secondary winding 51 is reversed, and the direction of a rectifier 52 is reversed. In this example, a secondary output voltage $V_A$ 50 becomes the sum of the voltage $V_S$ across secondary winding 51 and the voltage $V_D$ across rectifier 52, or $V_A=V_S+V_D$. Since $V_S$ is $-M/N*V_{OUT}$, $V_A$ 40 becomes $-(M/N*V_{OUT}-V_D)$. Thus, the step-down switching regulator in FIG. 2C produces a negative output voltage.

Figure 2D:
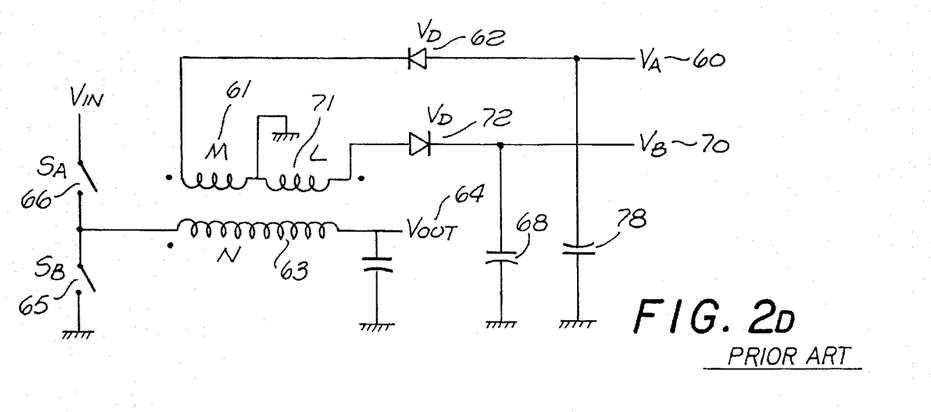
FIG. 2D is a prior art step-down switching regulator for generating a positive and negative secondary output voltages.

FIG. 2D is a prior art step-down switching regulator for generating a positive and negative secondary output voltages. The step-down switching regulator in FIG. 2D incorporates two secondary windings 61 and 71, each having M turns and L turns, respectively. Secondary winding 61 is connected in the same way as secondary winding 51 is FIG. 2C. However, while secondary winding 51 is coupled to $V_A$ 50 in FIG. 2C, secondary winding 61 is coupled to an output voltage $V_A$ 60 in FIG. 2D. Secondary winding 71 is connected in the same way as secondary winding 31 in FIG. 2A. Secondary winding 71 is coupled to $V_B$ 70 as secondary winding 31 is coupled to $V_A$ 30 in FIG. 2A. Therefore, $V_A$ 60, like $V_A$ 50, becomes $-(M/N*V_{OUT}-V_D)$. Likewise, $V_B$ 70, like $V_A$ 30, becomes $M/N*V_{OUT}-V_D$. Accordingly, the step-down switching regulator in FIG. 2D produces both a negative output voltage and a positive output voltage.

A step-down converter is the most efficient converter topology. However, the efficiency factor can be degraded by various loss mechanisms listed below from the highest to the lowest loss:

1. Switch and inductor resistive losses;
2. Transformer core losses;
3. Switching losses;
4. Controller element quiescent power.

Under medium to heavy load currents, loss mechanisms 1 and 2 dominate. However, at light load currents, loss mechanisms 1 and 2 are relatively low compared to loss mechanisms 3 and 4. Modern converters, therefore, reduce the switching frequency at light loads to minimize losses due to loss mechanism 3, and thereby improve light load efficiency.

Now referring again to FIG. 1B, the efficiency improvement at light load currents is typically achieved by skipping switching cycles of $S_A$ 10 and $S_B$ 11 entirely and delivering a predetermined amount of energy to a load during a cycle. Switch $S_A$ 10 is turned on for a predetermined amount of time, or until a packet of energy is delivered to the load. A control circuit (not shown) that controls $S_A$ 10 and $S_B$ 11 then goes into a low current mode, disables switching of $S_A$ 10 and $S_B$ 11 until $V_{OUT}$ 17 drops to a level that causes this process to be repeated. The process starts again by turning on $S_A$ 10.

Continuing to refer to FIG. 1B, this scheme has a drawback when multiple winding topology is incorporated. The control circuit can only regulate one of the outputs-the primary output coupled to primary winding 15 or the secondary output coupled to secondary winding 16—usually chosen to be the primary output. When the regulated primary output is lightly loaded, or not loaded at all, a feedback loop that couples the primary output to the control circuit turns on the high side switch such as $S_A$ 10 in FIG. 1B infrequently to preserve efficiency. This results in no power being delivered to the secondary output. If the secondary output is connected to a heavy load, the secondary output voltage collapses and cannot be regulated.

Another simple way to control a secondary output voltage in a step-down switching regulator may be alternatively pulsing switches such as $S_A$ 10 and $S_B$ 11 in FIG. 1B constantly so that energy is always delivered to the secondary output, rather than providing a feedback loop between the secondary output and a control circuitry. This scheme may seem effective, but has very low efficiency at light primary loads as indicated above.

SUMMARY OF THE INVENTION

The present invention provides methods and apparatus for regulating one or more secondary output voltages and the primary output voltage in a step-down switching regulator without compromising light load efficiency and for regulating the secondary output voltages regardless of the load on the primary output.

A step-down switching regulator of the present invention includes (1) a magnetic storage device having at least one primary winding, one primary output and one secondary output, (2) a current sensing device for detecting a current through the primary winding of the magnetic storage device, (3) a first switching device for connecting the primary winding to an input voltage, (4) a second switching device for connecting the primary winding to ground, (5) a first comparator for detecting whether the current through the primary winding is greater than a limit value, (6) a second comparator for detecting loss of regulation in the secondary output, and (7) a switch logic circuitry for allowing only one of the first switching device or the second switching device to turn on at a time.

When the primary output is out of regulation, the first switching device turns on to deliver power to the primary output. When the secondary output is out of regulation, one of two methods can be used to supply power to the secondary output. A first method turns on the first switching device for a short time, and then the second switching device turns on to deliver power to the secondary output. A second method turns on the second switching device without first turning on the first switching device. In either methods, the second switching device can be turned off (1) at the end of a pre-determined time period, (2) at the end of a clock cycle, (3) when the current through the primary winding exceeds a pre-determined limit value or (4) when the current through the primary winding is substantially zero.

BRIEF DESCRIPTION OF THE DRAWINGS

FIG. 6C is a timing diagram showing an operation where a primary output is loaded, and a switch $S_A$ is pulsed on.

DETAILED DESCRIPTION OF THE INVENTION

The present invention provides methods and apparatus for regulating one or more secondary output voltages even in the absence of a load to the primary output.

Figure 3A:
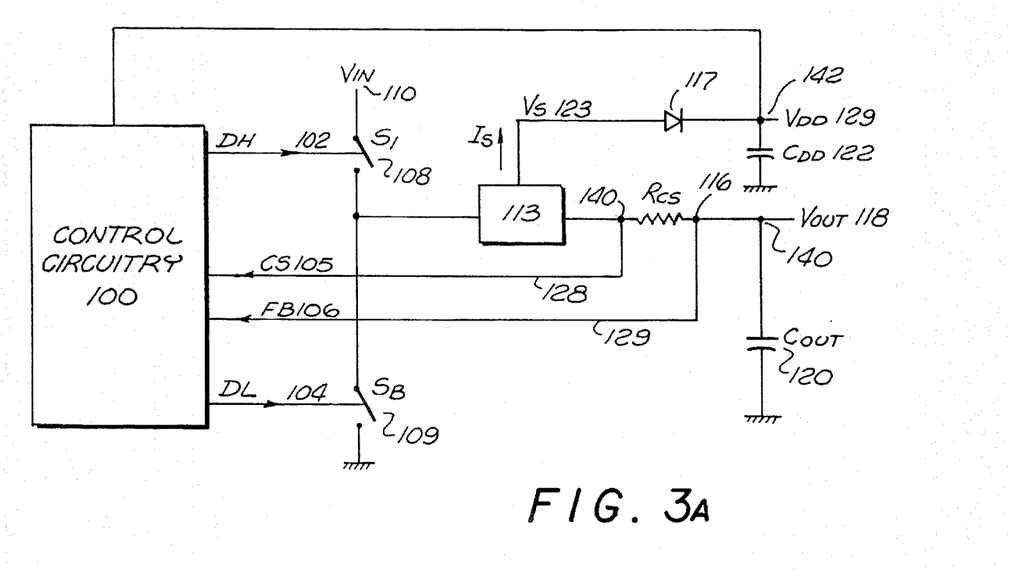
FIG. 3A is a step-down switching regulator having a control circuitry and having both a primary feedback loop and a secondary feedback loop according to the present invention.
Figure 7:
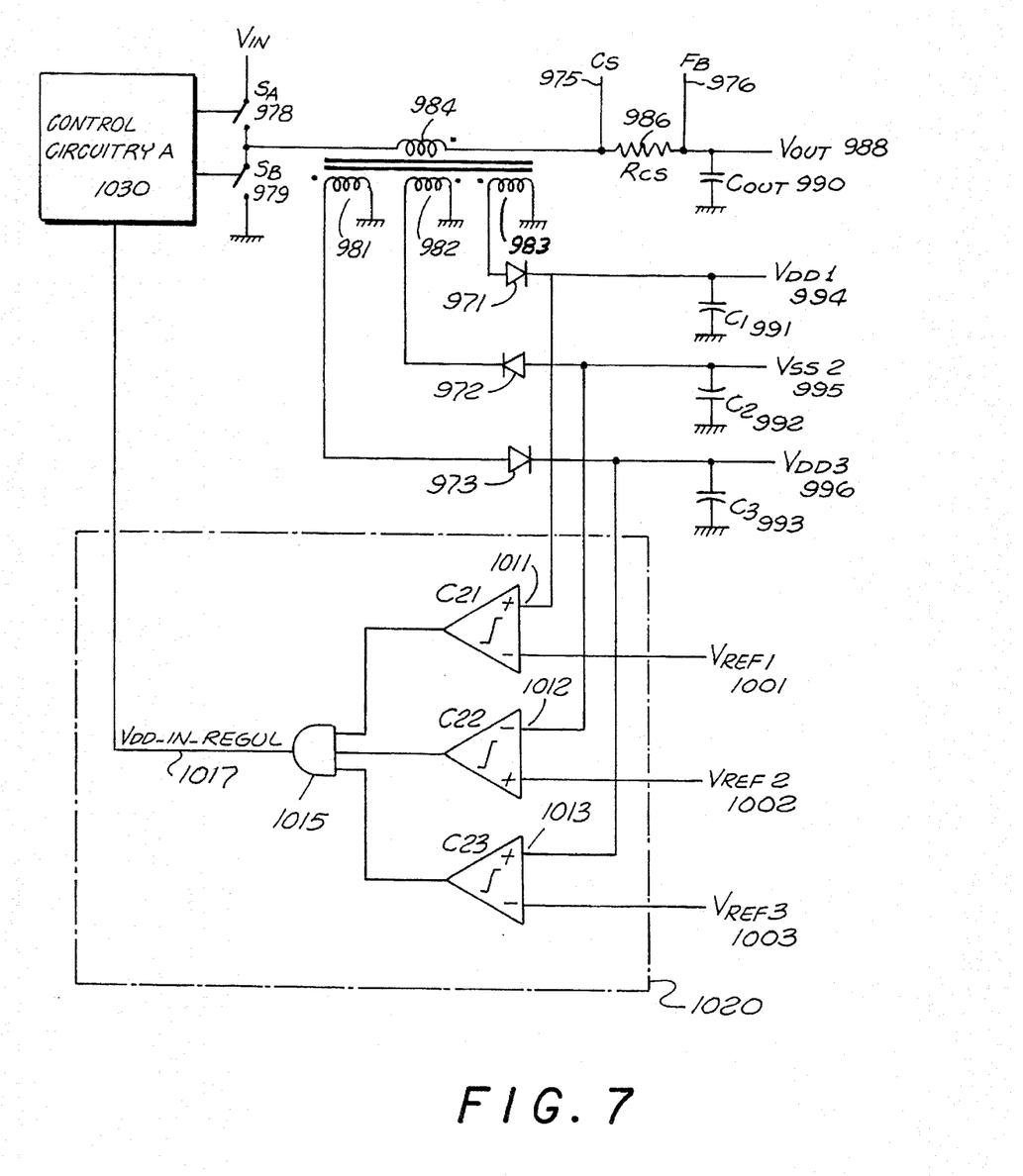
FIG. 7 is a step-down switching regulator with multiple secondary outputs.

The present invention provides a secondary feedback loop to control a secondary output voltage or multiple secondary output voltages in a step-down switching regulator and to minimize the drawbacks discussed above. FIG. 3A shows a step-down switching regulator 101 having a control circuitry 100 that is coupled to a primary output node 140 through a primary feedback loop comprised of 128 and 129, and to a secondary output node 142 through a secondary feedback loop 126. Although FIG. 3A shows one secondary output, multiple secondary outputs may be incorporated as shown in FIG. 7, in which case a control circuitry is coupled to each of the multiple secondary outputs. Step-down switching regulator 101 further includes (i) two switches $S_A$ 108 and $S_B$ 109, (ii) a magnetic storage device 113 that may be an inductor or a transformer, (iii) a rectifier 117, which can be a synchronous switch that turns on when $S_B$ 109 is on, (iv) an inductor current sense resister $R_{CS}$ 116 and (v) two charge storage devices $C_{OUT}$ 120 and $C_{DD}$ 122.

Figure 3B:
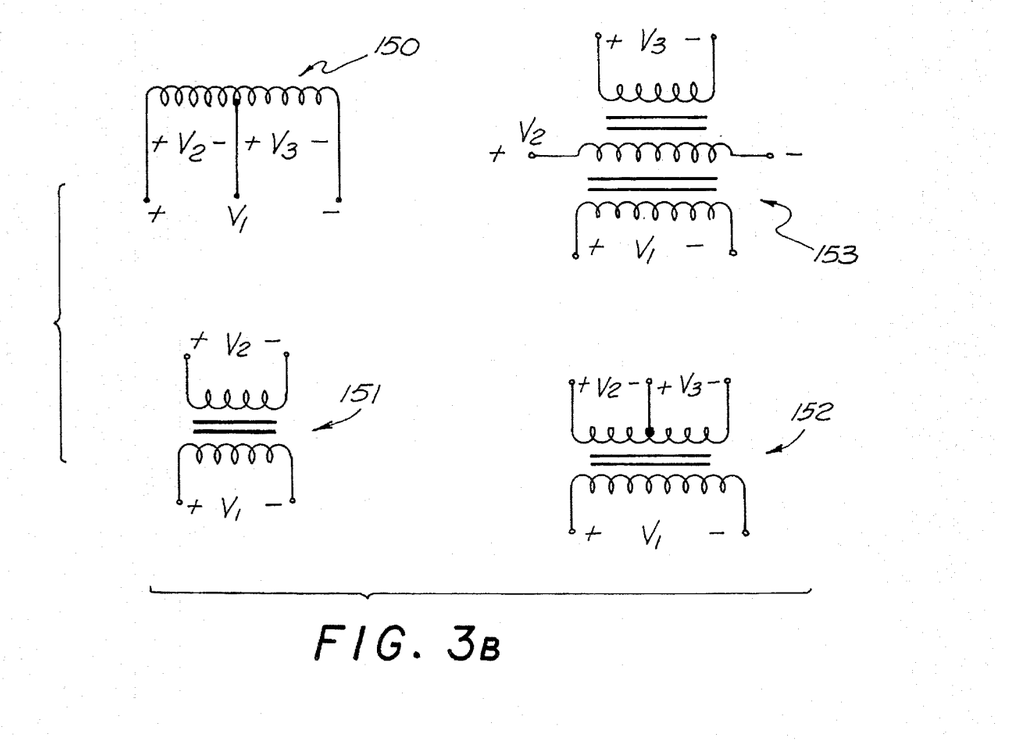
FIG. 3B presents examples of magnetic storage devices that can be incorporated in the present invention.

FIG. 3B shows some examples of magnetic storage devices that may be incorporated in a step-down switching regulator including a coupled inductor 150, a two-winding transformer 151, a three-winding transformer 152 and another three-winding transformer 153. These examples are shown for illustration purpose only and should not be taken as limiting the scope of the invention.

Figure 3C:
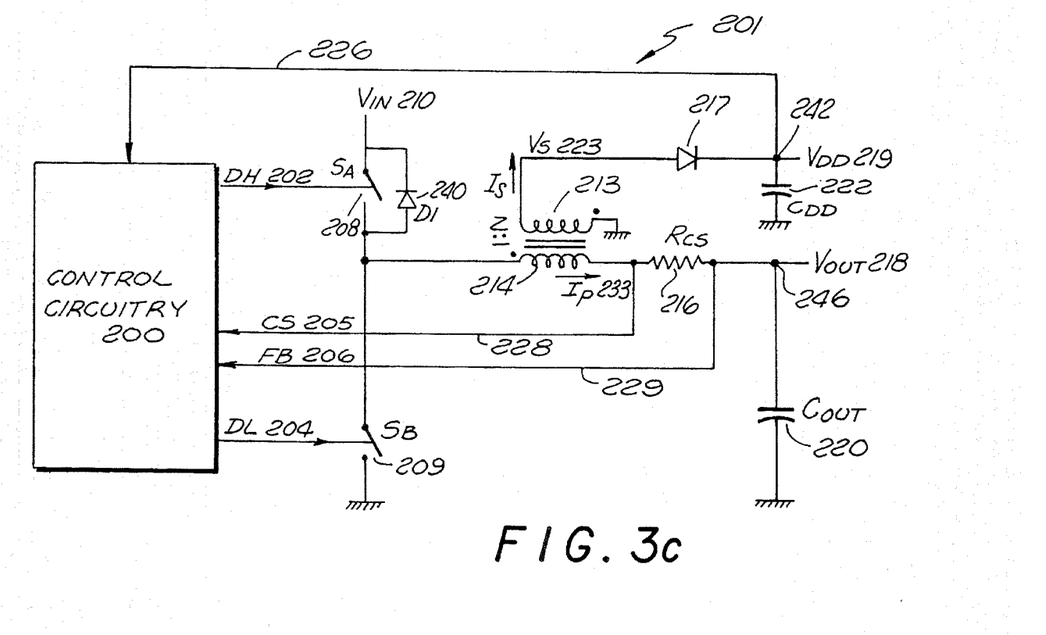
FIG. 3C presents a step-down switching regulator with a two-winding transformer according to the present invention.

FIG. 3C presents a step-down switching regulator 201 according to the present invention with a two-winding transformer having a primary winding 214 and a secondary winding 213 and having a turns ratio of N.

Figure 3D:
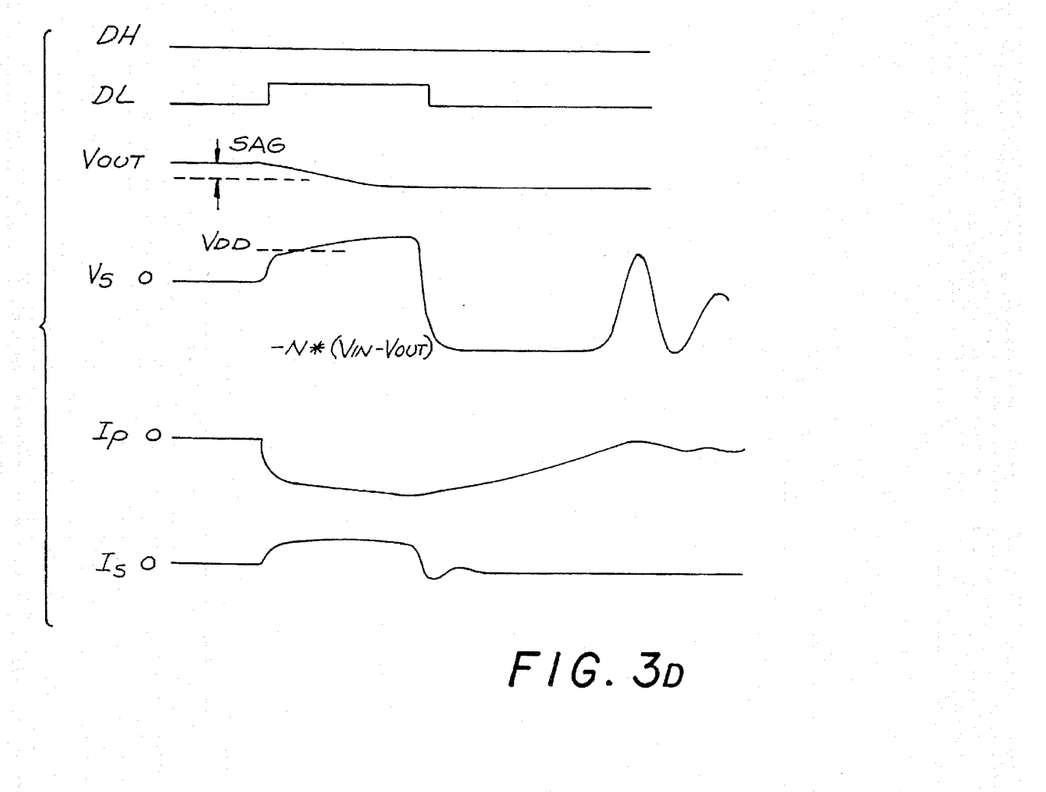
FIG. 3D presents current and voltage waveforms of the step-down switching regulator in FIG. 3C.

FIG. 3D shows typical current and voltage waveforms of step-down switching regulator 201 in FIG. 3D when $S_B$ 209 is pulsed for a fixed duration t0. Referring to FIGS. 3C and 3D, when DH 202 is high, $S_A$ 208 is on, and when DL 204 is high, $S_B$ 209 is on. When $S_B$ 209 is turned on, the voltage $V_{OUT}$ 218 is applied to primary winding 214. This causes the voltage $N*V_{OUT}$ to be developed across secondary winding 213, forcing current through primary winding 214 and secondary winding 213, and delivering power from a filter capacitor $C_{OUT}$ 220 to a secondary output node 242. The small output voltage sag at $V_{OUT}$ 218 in FIG. 3D would eventually be detected by a primary feedback loop of 228 and 229 coupled to a control circuitry 200 which would replenish the lost energy by turning on $S_A$ 208. When $S_B$ 209 is turned off, the voltage across primary winding 214 becomes $V_{IN}-V_{OUT}$ because of a diode D1 240, and $V_S$ becomes $-N*(V_{IN}-V_{OUT})$ for a short period of time. Switches $S_A$ 208 and $S_B$ 209 may be a device including but not limited to a MOSFET or a bipolar transistor. If $S_A$ 208 is an N-channel MOSFET, D1 240 is an inherent diode formed between the substrate and the drain of $S_A$ 208 when the substrate is tied to the source. On the other hand, if $S_A$ 208 is a bipolar transistor, D1 240 is a separate device external to the bipolar transistor.

Continuing to refer to FIGS. 3C and 3D, an inductor current sense resistor $R_{CS}$ 216 is normally used to measure and control a primary output current $I_P$ 233 under fault conditions as well as for other control mechanisms such as current mode control. In addition, $R_{CS}$ 216 is used to prevent excess energy being transferred from $C_{OUT}$ 220 to $C_{DD}$ 222. When current $I_P$ 233 exceeds a preset limit, switch $S_B$ 209 is turned off. Moreover, when $I_P$ 233 is substantially close to zero, switch $S_B$ 209 is turned off to enhance light load efficiency. On the other hand, when $I_P$ 233 is substantially close to zero, switch $S_B$ 209 may be kept on to deliver extra power to secondary output node 242.

According to the present invention, two different methods and apparatus may be utilized for controlling the secondary output voltage(s). These methods and apparatus will be described in reference to FIG. 3C. First, when control circuitry 200 detects loss of regulation in a secondary output voltage $V_{DD}$ 219 through a secondary feedback loop 226, control circuitry 200 initiates a switching cycle by first turning on $S_A$ 208 and then $S_B$ 209. This process delivers current to secondary output node 242. This scheme is effective in controlling the secondary output voltage, but may suffer from output over-shoot since when there is no load on primary winding 214, output voltage $V_{OUT}$ 218 tends to be at its maximum. This scheme is described below in more detail.

Figure 4A:
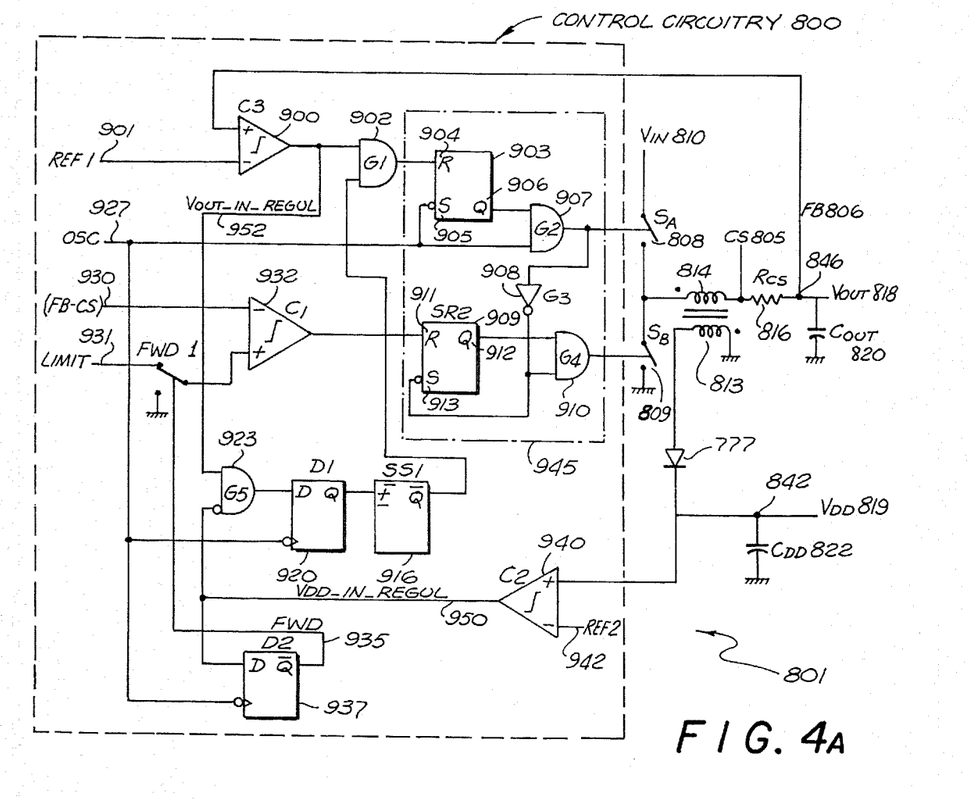
FIG. 4A is a step-down switching regulator showing a control circuitry according to the first method of the present invention.

FIG. 4A is a step-down switching regulator 801 according to the first scheme of the present invention. Step-down switching regulator 801 includes a control circuitry 800 having (i) three comparators C1 932, C2 940 and C3 900, (ii) a switch logic circuitry 945 including SR1 903, SR2 909, G2 907, G3 908 and G4 910, (iii) two flip-flops D1 920 and D2 937, (iv) a single shot switch SS1 916 and (v) two AND gates G1 902 and G5 923. It should be noted that inverter G3 908 is used to ensure that $S_A$ 808 and $S_B$ 809 are not turned on at the same time.

Step-down switching regulator 801 further includes (i) a primary winding 814, the first side of which is coupled to either switch $S_A$ 808 or $S_B$ 809, (ii) a secondary winding 813, the first side of which is coupled to ground, (iii) an inductor current sense resister $R_{CS}$ 816 coupled to the second side of primary winding 814 and to comparator C3 900, (iv) a storage device $C_{OUT}$ 820 coupled to $R_{CS}$ 816 and to $V_{OUT}$ 818, (v) a rectifier 777 coupled to the second side of secondary winding 813 and to comparator C2 940, and (vi) a storage device $C_{DD}$ 822 coupled to rectifier 777, to a secondary output voltage $V_{DD}$ 819 and to C2 940. Although a diode like D1 240 in FIG. 3C is not shown in FIG. 4A, it can be incorporated here as well.

Figure 4B:
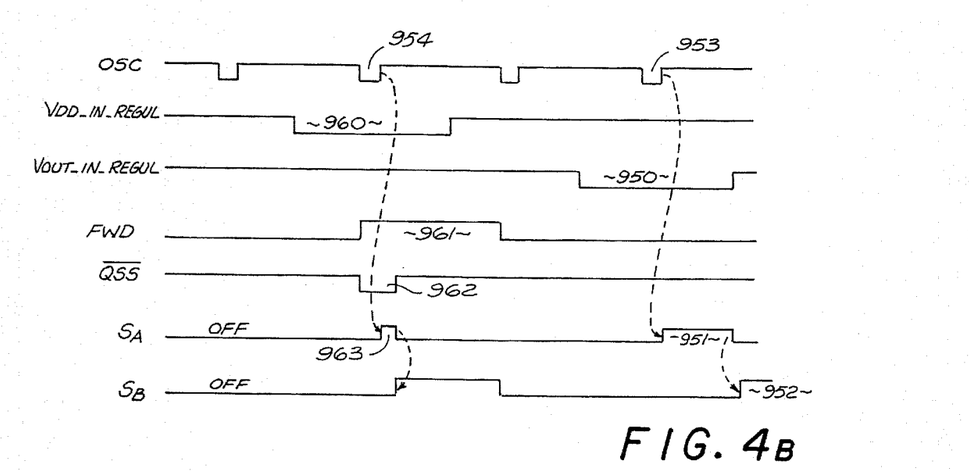
FIG. 4B is a timing diagram of the step-down switching regulator in FIG. 4A.

FIG. 4B is a timing diagram of step-down switching regulator 801 in FIG. 4A showing how primary output voltage $V_{OUT}$ 818 and secondary output voltage $V_{DD}$ 819 are regulated according to the first scheme of the present invention.

Now referring to FIGS. 4A and 4B, comparator C3 900 detects whether primary output voltage $V_{OUT}$ 818 is in regulation and generates a VOUTINREGUL signal 952. VOUTINREGUL 952 is HIGH when $V_{OUT}$ 818 is in regulation, and VOUTINREGUL 952 is LOW when $V_{OUT}$ 818 is out of regulation. When VOUTINREGUL 952 is HIGH and the output of SS1 916 is HIGH, a reset R 904 of SR1 903 is HIGH, causing the output of SR1 903 to go LOW, and thus, turning off $S_A$ 808. When $V_{OUT}$ 818 falls out of regulation ($V_{OUT}$ 818 is less than REF1 901), VOUTINREGUL 952 becomes LOW, shown as 950 in FIG. 4B, R 904 become LOW, and $S_A$ 808 turns on at the rising edge of OSC 927 and stays on (shown as a region 951) until VOUTINREGUL 952 becomes HIGH again. When $S_A$ 808 turns off, $S_B$ 809 turns on (shown as a region 952) to deliver power to a secondary output node 842.

Comparator C2 940 detects whether secondary output voltage $V_{DD}$ 819 is in regulation by monitoring whether $V_{DD}$ 819 is above a preset reference level (REF2) 942. When $V_{DD}$ 819 falls out of regulation, shown as a region 960 in FIG. 4B, a VDD-IN-REGUL signal 950 is clocked into flip-flops D1 920 and D2 937. At the falling edge of OSC 927, a FWD signal 935 turns on (shown as a region 961), and SS1 916 generates a LOW pulse for a short duration, causing the output of G1 902 to go LOW. This allows $S_A$ 808 to turn on at the rising edge of OSC 927. $S_A$ 808 stays on (shown as a region 963) until the short LOW pulse times out. When the short LOW pulse of SS1 916 times out, G1 902 resets SR1 903 and turns off $S_A$ 808. This causes the synchronous switch SR2 909 to latch and turn on $S_B$ 809, delivering power to secondary output node 842. While FWD 935 is HIGH, the positive side of C1 932 is connected to a LIMIT signal 931, and the voltage signal of (FB–CS) 930 is compared to LIMIT 931. C1 932 outputs HIGH and causes $S_B$ 809 to turn on as long as (FB–CS) 930 is less than LIMIT 931. $S_B$ 809 is turned off (1) at the end of a predetermined time period, (2) at the end of a clock cycle, (3) when the current through primary winding 813 exceeds a pre-determined limit value or (4) when the current through primary winding 813 is substantially zero.

A second scheme of the present invention, an improvement over the first scheme, is described below. Referring to FIG. 3C, when control circuitry 200 detects loss of regulation in secondary output voltage $V_{DD}$ 219 through secondary feedback loop 226, control circuitry 200 turns on $S_B$ 209 for a fixed amount of time, and power is delivered from a primary output node 246 to secondary output node 242. As a consequence of energy loss from primary output node 246, primary feedback loop 228 and 229 will cause control circuitry 200 to initiate a switching cycle by turning on $S_A$ 208 first and then $S_B$ 209. This scheme is implemented in the preferred embodiment of the present invention, as shown in FIG. 5.

Figure 5:
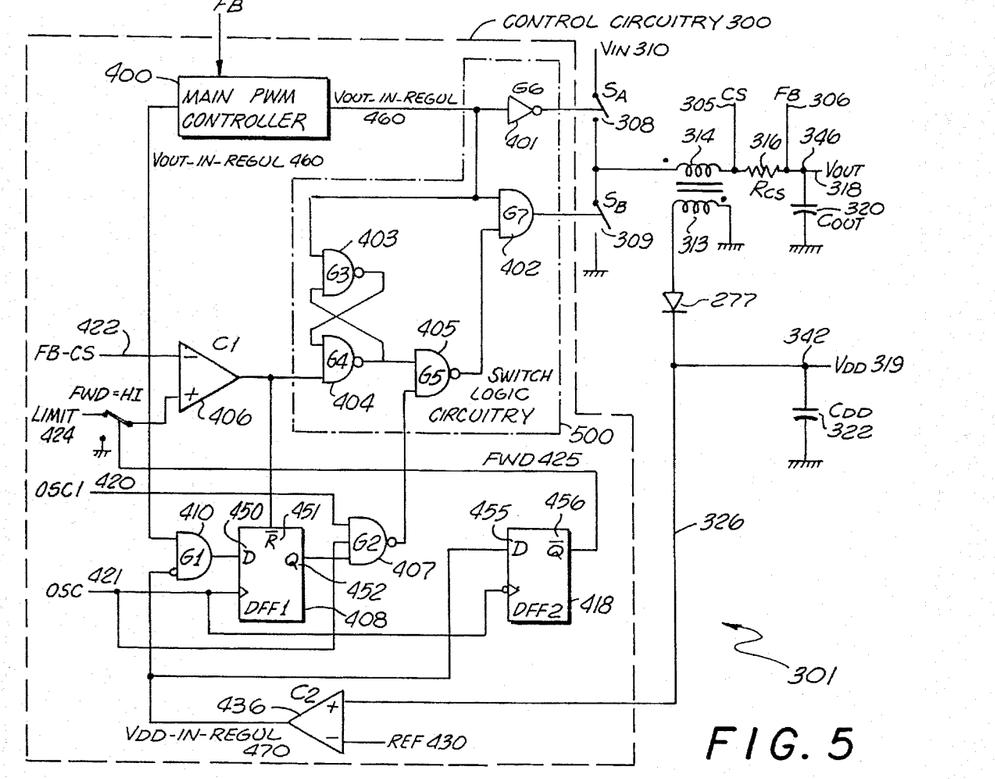
FIG. 5 is a step-down switching regulator showing a control circuitry according to the second method of the present invention.

Now referring to FIG. 5, a step-down switching regulator 301 shows a control circuitry 300 in detail according to the present invention. Control circuitry 300 has (i) a main Pulse-Width-Modulated (PWM) controller 400, (ii) a switch logic circuitry 500 including gates G3 403, G4 404, G5 405, G6 401 and G7 402, (iii) two comparators C1 406 and C2 436, (iv) two flip-flops DFF1 408 and DFF2 418 and (v) two gates—one AND gate G1 410 and one NAND gate G2 407. Step-down switching regulator 301 includes, in addition to control circuitry 300, (i) a primary winding 314, the first side of which is coupled to either $S_A$ 308 or $S_B$ 309, (ii) a secondary winding 313, the first side of which is coupled to ground, (iii) an inductor current sense resister $R_{CS}$ 316 coupled to the second side of primary winding 314 and to control circuitry 300 through CS 305 and FB 306, (iv) a storage device $C_{OUT}$ 320 coupled to $R_{CS}$ 316 and to $V_{OUT}$ 318, (v) a rectifier 277 coupled to the second side of secondary winding 313 and to comparator C2 436 and (vi) a storage device $C_{DD}$ 322 coupled to rectifier 277, to a secondary output voltage $V_{DD}$ 319 and to C2 436.

Continuing to refer to FIG. 5, comparator C2 436 detects whether secondary output voltage $V_{DD}$ 319 is in regulation by monitoring whether $V_{DD}$ 319 is above a preset reference level (REF) 430. Gate G1 410 ensures that energy is delivered to a secondary output node 342 only if primary output voltage $V_{OUT}$ 318 is in regulation or, in other words, a signal VOUTINREGUL 460 is HIGH. Flip-flop DFF1 408 is used to synchronize the inverted signal of VDDINREGUL 470 and VOUTINREGUL 460 to an oscillator (OSC) 421, and to latch the output value of G1 410.

Continuing to refer to FIG. 5, Flip-flop DFF2 418 latches the state of VDDINREGUL 470 to set the current limit value for C1 406. Comparator C1 monitors the current through primary winding 314 by measuring the voltage (FB 306–CS 305) across RCS 316, and compares this voltage (FB–CS) 422 to a preset limit signal LIMIT 424 or to ground. If a FWD signal 425 of DFF2 418 is HIGH, the positive input side of C1 406 is coupled to LIMIT 424. Otherwise, the positive input side of C1 406 is connected to ground. The state of FWD signal 425 depends on whether secondary output voltage $V_{DD}$ 319 is in regulation. FWD signal 425 of DFF2 418 is HIGH when secondary output voltage $V_{DD}$ 319 is below REF 430, or VDDINREGUL 470 is LOW. FWD signal 425 of DFF2 418 is LOW if secondary output voltage $V_{DD}$ 319 is above REF 430, or VDDINREGUL 470 is HIGH.

Continuing to refer to FIG. 5, switch logic circuitry 500 provides the necessary drive logic to switches $S_A$ 308 and $S_B$ 309. Switch logic circuitry 500 includes gates G3 407 through G7 402. Switch logic circuitry 500 ensures that both $S_A$ 308 and $S_B$ 309 are not on at the same time. If $S_A$ 308 is not on, $S_B$ 309 turns on upon detection of loss of regulation on secondary output voltage $V_{DD}$ 319. $S_B$ 309 is typically kept on only for a predetermined amount of time to minimize the voltage sag as shown in FIG. 3D at $V_{OUT}$ 318. Oscillators OSC 421 and OSC1 420 are timing signals provided for switch logic circuitry 500.

Voltage level FB 306 is coupled to main PWM controller 400 so that main PWM controller 400 can determine whether $V_{OUT}$ 318 is in regulation and provide appropriate signal level for VOUTINREGUL 460. Main PWM controller 400 may include a comparator such as C3 900 in FIG. 4A to detect whether $V_{OUT}$ 318 is out of regulation. VOUT INREGUL 460 is HIGH when $V_{OUT}$ 318 is in regulation, and VOUTINREGUL 460 is LOW when $V_{OUT}$ 318 falls out of regulation. Main PWM controller 400 also provides input signals that control switches $S_A$ 308 and $S_B$ 309. When VOUTINREGUL 460 is LOW, G6 410 turns on $S_A$ 308 to bring $V_{OUT}$ 318 into regulation, and $S_B$ 309 is Off. Since PWM controllers are well known by those skilled in the art, a detailed discussion of main PWM controller 400 is not necessary.

Figure 6A:
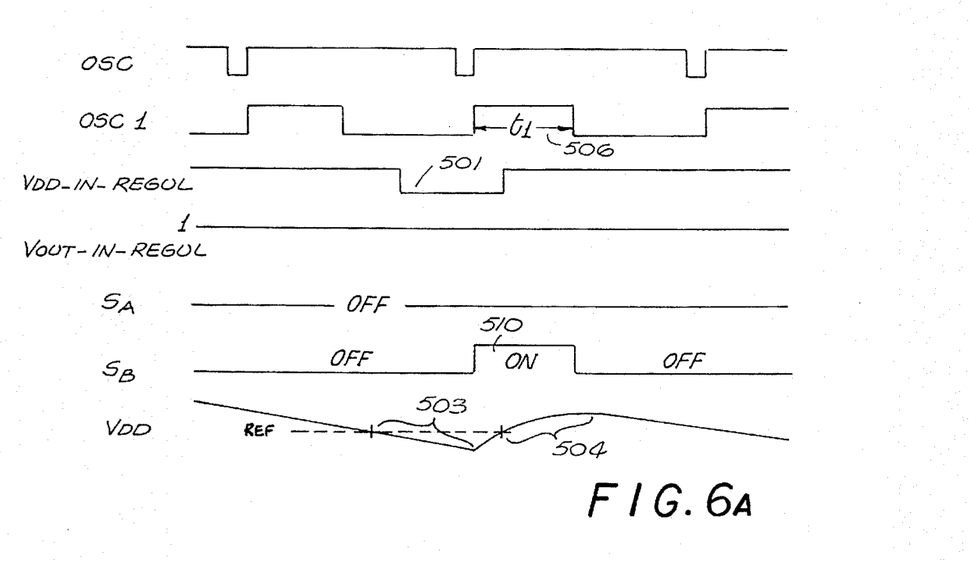
FIG. 6A is a timing diagram of the step-down switching regulator in FIG. 5 showing the operation of a secondary feedback loop that turns on a switch $S_B$ to regulate a secondary output voltage.

FIG. 6A shows a timing diagram of step-down switching regulator 301 shown in FIG. 5. Now referring to FIGS. 5 and 6A, in this example, primary output voltage $V_{OUT}$ 318 is in regulation so that VOUTINREGUL 460 is set HIGH (logic 1). Secondary output voltage $V_{DD}$ 319 is also in regulation at the beginning of the cycle, or VDDINREGUL 470 is HIGH. Both switches $S_A$ 308 and $S_B$ 309 are off initially. When there is a heavy load at secondary output node 342, $V_{DD}$ 319 droops below reference level (REF) 430, shown as a region 503 in FIG. 6A. As a result, VDDINREGUL 470 goes LOW (logic 0), shown as a region 501.

Continuing to refer to FIGS. 5 and 6A, since VOUTIN REGUL 460 is HIGH and VDDINREGUL 470 is LOW, AND gate G1 410 sends a logic 1 to an input D 450 of DFF1 408. DFF1 450 latches the input value on the rising edge of OSC 421, and switch $S_B$ 309 turns on (a region 510) to boost $V_{DD}$ 319, shown as a region 504. Switch $S_A$ 308 stays off. Switch $S_B$ 309 is kept on for a preset duration t1 506 to deliver a large enough pocket of charge to output capacitor $C_{DD}$ 322. Without the latching action of DFF1 408, $S_B$ 309 would have been turned off as soon as $V_{DD}$ 319 exceeds reference level (REF) 430. This would create many short pulses instead of few long pulses to deliver the same amount of power to secondary output node 342, again increasing switching losses and compromising efficiency.

Figure 6B:
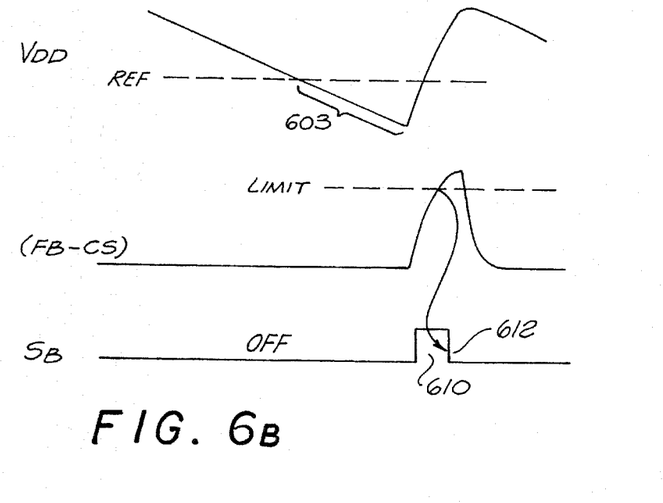
FIG. 6B is a timing diagram of a cycle that is terminated by the current limiting feature of the present invention.

FIG. 6B is a timing diagram of step-down switching regulator 301 shown in FIG. 5 in which excess current is demanded from output capacitor $C_{OUT}$ 320. Now referring to FIGS. 5 and 6B, the initiation of the cycle is similar to the case of FIG. 6A. VOUTINREGUL 460 is HIGH, and both switches $S_A$ 308 and $S_B$ 309 are off initially. When $V_{DD}$ 319 droops below reference level (REF) 430, shown as a region 603, $S_B$ 309 turns on (a region 610) to boost $V_{DD}$ 319. Region 610 corresponds to region 510 in FIG. 6A. Up to this point, the operation in FIG. 6B is the same as the one in FIG. 6A. However, when the current through primary winding 314 exceeds the current limit value, a signal FB–CS 422, which is obtained by subtracting CS 305 from FB 306, will exceed LIMIT 424, and the output of comparator C1 406 goes LOW. When a reset $\overline{R}$ 451 senses LOW from the output of C1 406, flip-flop DFF1 408 resets, and an output Q 452 of DFF1 408 becomes LOW. As a result, $S_B$ 309 turns off, shown as a region 612. Accordingly, when excess current in primary winding 314 is detected, $S_B$ 309 turns off, minimizing the output voltage sag at $V_{OUT}$ 318.

Figure 6C:
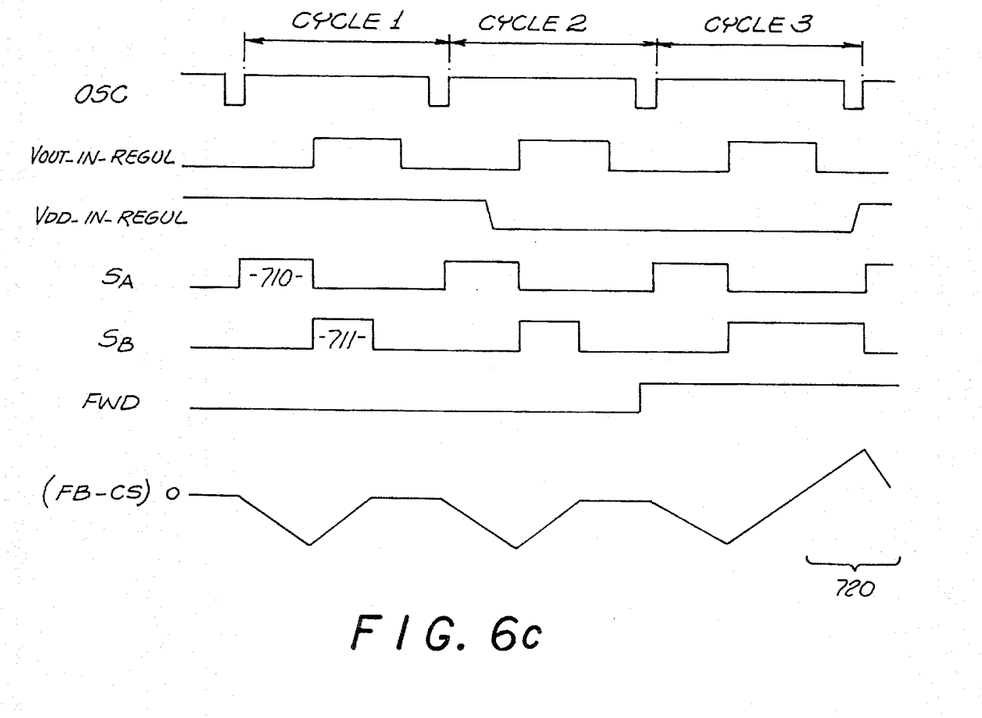

FIG. 6C is a timing diagram showing an operation where a primary output node 346 is loaded, and switch $S_A$ 308 is pulsed on in FIG. 5. Referring to FIGS. 5 and 6C, during cycles 1 and 2, step-down switching regulator delivers energy to both output nodes 346 and 342. At the beginning of cycle 1, the current through primary winding 314 is directed in a negative direction while $S_A$ 308 is on (a region 710), and the current through primary winding 314 becomes more negative until VOUTINREGUL becomes HIGH (or $V_{OUT}$ 318 comes into regulation). The current through primary winding 314 can be viewed as (FB–CS) in FIG. 6C. When $V_{OUT}$ 318 is in regulation, $S_A$ 308 turns off and $S_B$ 309 turns on to deliver energy to $V_{DD}$ 319. When $S_B$ 309 turns on (a region 711), the current through primary winding 314 changes its direction and starts to become more positive. In cycle 1, $S_B$ 309 turns off when the current through primary winding 314 becomes zero.

When $S_A$ 308 is on, current flows through primary winding 313 to output node 346. When $S_A$ 308 is turned off by main PWM controller 400, and $S_B$ 309 is turned on, energy is delivered to output node 342. During these two cycles, the positive input side of comparator C1 406 is connected to ground because FWD 425 is LOW. Therefore, as soon as the current through $R_{CS}$ 316 reaches zero, or FB–CS 422 becomes zero, the output of C1 406 becomes LOW, DIFF 1 408 resets, and $S_B$ 309 is turned off. When $V_{DD}$ 319 goes out of regulation, or VDDINREGUL is LOW, a logic 1 (HIGH) is latched into DFF2 418, and FWD 425 becomes HI, as in cycle 3.

Continuing to refer to FIGS. 5 and 6C, the first portion of cycle 3 is identical to cycles 2 and 3 where $S_A$ 308 is on. However, because FWD 425 is HI, the positive side of comparator C1 406 is coupled to LIMIT 424. Since FB–CS 422 is less than LIMIT 424, $S_B$ 309 does not turn off when the current through primary winding 314 becomes zero, but instead $S_B$ 309 stays on until cycle 3 ends. Extra energy is, thus, delivered to $V_{DD}$ 319. A region 720 in FIG. 6C indicates that extra energy on FB–CS 422.

FIG. 7 presents a step-down switching regulator 971 with multiple secondary outputs. Step-down switching regulator 971 has one primary winding 984 and three secondary windings 981, 982 and 983. An inductor current sense resistor $R_{CS}$ 816 is provided to sense the current in primary winding 984. Nodes FB 976 and CS 975 are coupled to control circuitry A 1030 in a similar manner as those shown in FIGS. 4B and 5. Each of secondary windings 981, 982 and 983 is coupled to a rectifier, a secondary output node, a secondary capacitor and a comparator. A secondary output voltage may be positive like $V_{DD1}$ 994 or $V_{DD3}$ 996 or may be negative like $V_{SS2}$ 995. Accordingly, $V_{REF1}$ 1001 and $V_{REF3}$ 1003 are positive, and $V_{DD1}$ 994 or $V_{DD3}$ 996 falls out of regulation if $V_{DD1}$ 994 or $V_{DD3}$ 996 becomes less than $V_{REF1}$ 1001 or $V_{REF3}$ 1003, respectively. On the other hand, $V_{REF2}$ 1002 is negative, and $V_{SS1}$ 995 falls out of regulation if $V_{SS1}$ 995 becomes greater than $V_{REF2}$ 1002.

Continuing to refer to FIG. 7, an AND gate 1015 is used to combine comparators C21 1011, C22 1012 and C23 1013. When any of $V_{DD1}$ 994, $V_{SS1}$ 995 and $V_{DD3}$ 996 is out of regulation, a VDDINREGUL signal 1017 becomes LOW, and power is delivered to the secondary output nodes using any of the two schemes described above in accordance with the present invention. To regulate multiple secondary outputs, a control circuit similar to control circuitry 300 in FIG. 5 or control circuitry 800 in FIG. 4A can be used except that C2 940 in FIG. 4B or C2 436 in FIG. 5 will be replaced with a comparator logic 1020 of FIG. 7.

It should be noted that each of the step-down switching regulators described according to the present invention in FIGS. 4A and 5 has a positive input voltage and a positive output voltage. Those skilled in the art can easily extend the present invention to inverse voltages. For example, $V_{SS1}$ 995 in FIG. 7 is a negative output voltage.

While the present invention has been particularly described with reference to FIGS. 1 through 7, it should be understood that the figures are for illustration only and should not be taken as limiting the scope of the invention. Many changes and modifications may be made to the invention, by one of ordinary skill in the art, without departing from the spirit and scope of the invention as disclosed herein.

I claim:

1. A switching regulator comprising:

a magnetic storage device having at least a first output and a second output;

a current sensing device for detecting a current through a primary winding of said magnetic storage device, said current sensing device coupled to said primary winding and to a control circuitry;

a first switching device for connecting an input side of said primary winding to a first input voltage, said first switching device coupled to said input side of said primary winding, to said control circuitry and to said first input voltage, said first switching device controlled by said control circuitry;

a second switching device for connecting an input side of said primary winding to a second input voltage, said second switching device coupled to said input side of said primary winding, to said control circuitry and to said second input voltage, said second switching device controlled by said control circuitry;

said first output of said magnetic storage device coupled to said primary winding and to said control circuitry;

said second output of said magnetic storage device coupled to said control circuitry; and said control circuitry comprising:

a first comparator for detecting whether said current through said primary winding is greater than a limit value, said first comparator coupled to said current sensing device, to said limit value, and to said second switching device;

a second comparator for detecting loss of regulation in said second output, said second comparator coupled to said second output and to said second switching device;

a switch logic circuitry for allowing only one of said first switching device and said second switching device to turn on at a time, said switch logic circuitry coupled to said second comparator, to said first comparator, to said first switching device and to said second switching device.

2. The switching regulator according to claim 1 wherein said magnetic storage device is a transformer, said first output of said magnetic storage device is a primary output, and said second output of said magnetic storage device is a secondary output wherein said secondary output produces one of a positive output voltage and a negative output voltage.

3. The switching regulator according to claim 2 wherein when said primary output contains no load, said secondary output is regulated and power is delivered to said secondary output.

4. The switching regulator according to claim 1 further including a main PWM controller for detecting whether said first output is out of regulation, for turning on said first switching device when said first output is out of regulation and for issuing a VOUTINREGUL signal.

5. The switching regulator according to claim 1 wherein if said first output is in regulation and if said second output is out of regulation, then said control circuitry turns on said second switching device and delivers power to said second output.

6. The switching regulator according to claim 5 wherein said second switching device stays on for a pre-determined time.

7. The switching regulator according to claim 5 wherein said second switching device turns off when said current through said primary winding is greater than said limit value.

8. The switching regulator according to claim 1 wherein said limit value is one of zero and a pre-determined limiting value;

wherein a positive input side of said first comparator is coupled to zero if said second output is in regulation;

wherein said positive input side of said first comparator is coupled to said pre-determined limiting value if said second output is out of regulation.

9. The switching regulator according to claim 8 wherein when said positive input side of said first comparator is coupled to said pre-determined limiting value, said second switching device stays even when said current through said primary winding becomes substantially zero, and said second switching device stays on until a cycle ends to deliver extra power to said second output.

10. The switching regulator according to claim 1 wherein said current sensing device includes a resistor.

11. The switching regulator according to claim 1 wherein when said current through said primary winding is substantially zero, said second switching device is turned off to improve light load efficiency.

12. The switching regulator according to claim 1 further including:

a third output and a fourth output, each coupled to said magnetic storage device; and said control circuitry further comprising:

a third comparator for detecting loss of regulation in said third output, said third comparator coupled to said third output;

a fourth comparator for detecting loss of regulation in said fourth output, said fourth comparator coupled to said fourth output;

a first AND gate having a plurality of inputs, said plurality of inputs of said first AND gate coupled to said second comparator, to said third comparator and to said fourth comparator.

13. The switching regulator according to claim 1 further comprising:

a rectifier coupled to said magnetic storage device and to said second output; and said control circuitry further comprising:

a main PWM controller for detecting whether said first output is in regulation, for issuing HIGH for a VOUT INREGUL signal if said first output is in regulation and LOW for said VOUTINREGUL signal if said first output is out of regulation, and turning on said first switching device if said first output is out of regulation, said main PWM controller coupled to said switch logic circuitry and to said first output;

a first AND gate for determining if said VOUTIN REGUL signal is HIGH and if a VDDINREGUL signal issued by said second comparator is LOW, said first AND gate coupled to said main PWM controller and said second comparator;

a first flip-flop for storing an output from said first AND gate and for resetting said first flip-flop if said first comparator outputs a LOW, said first flip-flop coupled to said first AND gate and a first oscillator;

a first NAND gate, said first NAND gate coupled to said first flip-flop, said first oscillator, a second oscillator and said switch logic circuitry;

a second flip-flop for storing an inverse of said VDD INREGUL signal, said second flip-flop coupled to said VDDINREGUL signal and to a positive input side of said first comparator; and said switch logic circuitry including:

an inverter coupled to said main PWM controller, to a second AND gate, and to said first switching device;

a second NAND gate having a first input, a second input and a third output, said first input coupled to said main PWM controller and to said inverter;

a third NAND gate having a third input, a fourth input and a fourth output, said third input coupled to said third output, said fourth input coupled to said first comparator, and said fourth output coupled to said second input;

a fourth NAND gate having a fifth input, a sixth input and a fifth output, said fifth input coupled to said fourth output and said sixth input coupled to said first NAND gate;

a second AND gate having a seventh input, a eighth input and a sixth output, said seventh input coupled to said main PWM controller and to said inverter, said eighth input coupled to said fifth output, and said sixth output for controlling said second switching device.

14. The switching regulator according to claim 1 wherein said control circuitry further comprising:

a third comparator for detecting loss of regulation in said first output for turning on said first switching device if said first output is out of regulation, said third comparator coupled to said first output and to said first switching device.

15. The switching regulator according to claim 14 wherein when said first output is in regulation and when said second output is out of regulation, said first switching device turns on;

wherein after a single shot times out, said first switching device turns off;

wherein when said first switching device turns off, said second switching device turns on to deliver energy to said second output.

16. The switching regulator according to claim 14 further including:

a single shot device coupled to said second comparator, to said first switching device and to said second switching device;

wherein when said first output is in regulation and when said second output is out of regulation, said single shot device generates a LOW pulse to turn on said first switching device;

wherein after said single shot device stops generating said LOW pulse, said first switching device turns off;

wherein when said first switching device turns off, said second switching device turns on to deliver energy to said second output.

17. The switching regulator according to claim 14 further including:

a first AND gate for determining whether an output of said third comparator is HIGH and if an inverse of an output of said second comparator is HIGH, said first AND gate coupled to said third comparator and to said second comparator;

a first flip-flop for storing an output from said first AND gate, said first flip-flop coupled to said first AND gate;

a second flip-flop for storing an inverse of an output of said second comparator and for connecting a positive input side of said first comparator to one of a ground and a predetermined limiting value, said second flip-flop coupled to said second comparator and to said first comparator;

a single shot device coupled to said first flip-flop;

a second AND gate for ANDing said output of said third comparator and an output of said single shot device, said second AND gate coupled to said third comparator and to said single shot device;

a third flip-flop for resetting said third flip-flop when an output of said second AND gate is HIGH, said third flip-flop coupled to said second AND gate and to an oscillator;

a forth AND gate coupled to said third flip-flop, to said oscillator and to said first switching device;

an inverter for ensuring that said first switching device and said second switching device do not turn on at a same time, said inverter coupled to said first switching device;

a fourth flip-flop for storing an output of said first comparator, said fourth flip-flop coupled to said first comparator and said inverter;

a fifth AND gate coupled to said inverter, to said fourth flip-flop and to said second switching device.

18. In a switching regulator having a magnetic storage device including a first output and a second output, a first switching device coupled to a primary winding of said magnetic storage device, a second switch device coupled to said primary winding of said magnetic storage device, a control circuitry coupled to said first output, to said second output, to said first switching device and to said second switching device, a current sensing device measuring a current through said primary winding of said magnetic storage device, said current sensing device coupled to said primary winding and to said control circuitry, a method of regulating output voltages of said switching regulator comprising the steps of:

detecting a voltage of said first output being in regulation;

detecting a voltage of said second output being out of regulation by comparing the voltage of said second output to a first reference voltage;

turning on said first switching device;

turning off said first switching device;

turning on said second switching device;

turning off said second switching device when one of a first event, a second event, a third event and a fourth event occurs;

wherein said first event is said current becoming substantially zero;

wherein said second event is said current exceeding a pre-determined limit value;

wherein said third event is an end of a clock cycle;

wherein said fourth event is an end of a pre-determined time period.

19. In a switching regulator having a magnetic storage device including a first output and a second output, a first switching device coupled to a primary winding of said magnetic storage device, a second switching device coupled to said primary winding of said magnetic storage device, a control circuitry coupled to said first output, to said second output, to said first switching device and to said second switching device, a current sensing device for sensing a current through said primary winding of said magnetic storage device, said current sensing device coupled to said primary winding and to said control circuitry, a method of regulating output voltages of said switching regulator comprising the steps of:

detecting a voltage of said first output being in regulation;

detecting a voltage of said second output being out of regulation by comparing the voltage of said second output to a first reference voltage;

turning on said second switching device;

turning off said second switching device when one of a first event, a second event, a third event and a fourth event occurs;

wherein said first event is said current becoming substantially zero;

wherein said second event is said current exceeding a pre-determined limit value;

wherein said third event is an end of a clock cycle;

wherein said fourth event is an end of a pre-determined time period.

20. The method according to claim 19 wherein when said first output is coupled to a light load, said secondary output is regulated and power is delivered to said secondary output.

21. The method according to claim 19 wherein the step of detecting the voltage of said first output being in regulation includes turning on said first switching device if said first output is out of regulation; and turning off said first switching device when said first output voltage is in regulation.

22. The method according to claim 19 wherein the step of turning off said second switching device when said first event occurs requires an input side of a comparator to be connected to a ground, said comparator coupled to said current sensing device and to said second switching device;

wherein the step of turning off said second switching device when said second event occurs requires said input side of a comparator to be connected to said pre-determined limit value, said comparator coupled to said current sensing device and to said second switching device.

23. The method according to claim 19 wherein said first switching device and said second switching device are synchronous so that only one of said first switching device and said second switching device is turned at a time.

24. A method of regulating a switching regulator comprising the steps of:

changing a current in a first direction through a primary winding of a magnetic storage device until a first output coupled to said primary winding is in regulation;

changing said current in a second direction through said primary winding of said magnetic storage device to supply power to a second output coupled to said magnetic storage device until one of a first event, a second event, a third event and a fourth event occurs;

wherein said first event is said current becoming substantially zero;

wherein said second event is said current exceeding a pre-determined limit value;

wherein said third event is an end of a clock cycle;

wherein said fourth event is an end of a pre-determined time period.

25. A method of operating a switching regulator having a transformer with a primary and at least one secondary winding and having a first regulator output coupled to one end of the primary winding and a second regulator output coupled to the secondary winding, a second end of the primary winding being coupled to switches for controllably coupling the second end of the primary winding to a first supply voltage and to a second supply voltage, comprising the steps of:

controlling the switches to provide currents through the primary of the transformer to maintain the first regulator output above a first predetermined voltage; and, controlling the switches to provide time rates of change of currents through the primary of the transformer to maintain the second regulator output above a second predetermined voltage.

26. The method of claim 25 wherein the transformer is further comprised of a second secondary winding for providing a third regulator output, and the method further comprises the step of controlling the switches to provide time rates of change of currents through the primary of the transformer to maintain the third regulator output above a third predetermined voltage.

27. A switching regulator having a transformer with a primary and at least one secondary winding and having a first regulator output coupled to one end of the primary winding and a second regulator output coupled to the secondary winding, a second end of the primary winding being coupled to switches for controllably coupling the second end of the primary winding to a first supply voltage and to a second supply voltage, comprising:

a controller for:

controlling the switches to provide currents through the primary of the transformer to maintain the first regulator output above a first predetermined voltage; and, controlling the switches to provide time rates of change of currents through the primary of the transformer to maintain the second regulator output above a second predetermined voltage.

28. The switching regulator of claim 27 wherein the transformer is further comprised of a second secondary winding for providing a third regulator output, and the controller is further for controlling the switches to provide time rates of change of currents through the primary of the transformer to maintain the third regulator output above a third predetermined voltage.

29. A controller for a switching regulator having a transformer with a primary and at least one secondary winding and having a first regulator output coupled to one end of the primary winding and a second regulator output coupled to the secondary winding, a second end of the primary winding being coupled to switches for controllably coupling the second end of the primary winding to a first supply voltage and to a second supply voltage, the controller comprising:

circuitry for controlling the switches to provide currents through the primary of the transformer to maintain the first regulator output above a first predetermined voltage; and, for controlling the switches to provide time rates of change of currents through the primary of the transformer to maintain the second regulator output above a second predetermined voltage.

30. The controller of claim 29 for a switching regulator wherein the transformer is further has a second secondary winding for providing a third regulator output, where in the controller circuitry is also for controlling the switches to provide time rates of change of currents through the primary of the transformer to maintain the third regulator output above a third predetermined voltage.

* * * * *

UNITED STATES PATENT AND TRADEMARK OFFICE
CERTIFICATE OF CORRECTION

PATENT NO. : 5,532,577
DATED : July 2, 1996
INVENTOR(S) : Tunc Doluca

It is certified that errors appear in the above-identified patent and that said Letters Patent is hereby corrected as shown below:

In column 6 at lines 39-42, 46-47, 49-50, column 7 at lines 48, 50, column 8 at lines 15, 17-19, 22, 30, 38-39, 56, column 9 at line 13, column 11, claim 4 at line 9, claim 13 at line 65-67, and column 12, claim 13 at lines 5-6, please delete " VOUTINREGUL " and insert -- VOUT_IN_REGUL --.

In column 7 at lines 49-50, 53, 64, 66, column 8 at lines 32, 36, 39, column 9 at lines 31, 63, and column 12, claim 13 at lines 6, 17-19, please delete " VDDINREGUL " and insert -- VDD_IN_REGUL --.

In column 7 at line 56, please delete " RCS " and insert -- $R_{cs}$ --.

In column 13, claim 17, at line 18, please delete " predetermined " and insert -- pre-determined --.

Signed and Sealed this

Third Day of December, 1996

Attest:

BRUCE LEHMAN

Attesting Officer

Commissioner of Patents and Trademarks